United States Patent [19]

Morgan et al.

[11] 4,032,094

[45] June 28, 1977

[54] CONTROL OF POSITIONING SYSTEM AUTHORITY OVER AIRCRAFT CONTROL SURFACES AS A FUNCTION OF SURFACE MOVEMENT RATE

[75] Inventors: Charles P. Morgan, Marion; Jean L. Lamy, Cedar Rapids, both of Iowa

[73] Assignee: Rockwell International Corporation, El Segundo, Calif.

[22] Filed: May 19, 1976

[21] Appl. No.: 687,588

[52] U.S. Cl. ............................. 244/194; 318/565; 340/419; 340/248 A

[51] Int. Cl.² ........................................ G05D 1/00

[58] Field of Search ............ 244/175, 177–181, 244/194; 318/563, 565, 566; 340/222, 248 R, 248 A, 248 C, 248 E, 419; 91/363 A

[56] References Cited

UNITED STATES PATENTS

| | | |
|---|---|---|
| 2,665,086 | 1/1954 | Moog et al. ............... 318/565 X |
| 2,673,314 | 3/1954 | MacCallum ............... 244/194 X |
| 3,440,504 | 4/1969 | Boskovich et al. ......... 318/565 X |
| 3,624,479 | 11/1971 | Callas ........................... 318/565 |
| 3,778,696 | 12/1973 | Walters et al. .............. 318/565 |

OTHER PUBLICATIONS

Avery et al., "Frequency Detector Circuit," *Western Electric Technical Digest* No. 5, Jan. 1, 1967, p. 33.

*Primary Examiner*—Stephen G. Kunin
*Attorney, Agent, or Firm*—Terry M. Blackwood; Robert J. Crawford; L. Lee Humphries

[57] ABSTRACT

Method and apparatus for controlling aircraft flight control surfaces. A signal indicative of control surface movement rate is provided and tested for level and duration. When said rate indicative signal exceeds a predetermined level for a predetermined time, authority of positioning apparatus over the aircraft control surface is reduced.

8 Claims, 8 Drawing Figures

CONTROL OF POSITIONING SYSTEM AUTHORITY OVER AIRCRAFT CONTROL SURFACES AS A FUNCTION OF SURFACE MOVEMENT RATE

This invention generally relates to electronics and to controlling the authority of load moving systems over their mechanical loads.

Autopilot systems, from data received from various sensors and on-board computers, generate aircraft maneuver commands and present same to appropriate position servo systems which in turn automatically position, via electromechanical actuators, the aircraft control surfaces such as the elevators and ailerons. To avoid disastrous results should the autopilot malfunction and direct severe and sustained control surface deflections (e.g., direct a hardover maneuver), the FAA requires some means for assuring that the aircraft transient response can not exceed certain maximums. For instance, for the aircraft flying in a trimmed condition, an autopilot malfunction is not permitted to subject the aircraft to a change in G's exceeding one G (plus or minus) within the three seconds following the malfunction. Further, for the aircraft flying in a trimmed condition, an autopilot malfunction is not permitted to subject the aircraft to a roll angle change exceeding 60° (plus or minus) within three seconds following the malfunction, or 20° per second of roll rate.

To meet the safety requirements, it is common to limit the authority had by the position servo system over the control surface by limiting the torque which the actuator can deliver to the control surface. This is conventionally accomplished by either using a slip clutch between the actuator and the surface, which is set to slip at a predetermined torque, or by preventing the motor drive current, and thus the motor output torque, from exceeding pedetermined values. The latter is of course an electronic analogy of the former. Such authority limiting approaches meet the FAA certification requirements but, since the torque limit must be set relatively low to satisfy "worst case" flight conditions, they can seriously impair the aircraft performance capability at more commonly encountered flight conditions where more torque is required to produce FAA response limits.

Other approaches have included torque programming or disengaging as a function of G's or pitch rate alone. Such solutions are generally not totally satisfactory. For instance the aircraft can respond too quickly and exceed the certification limits before corrective action may be taken. Furthermore, nuisance disconnects can occur in turbulence.

In accordance with the present invention, the aforementioned difficulties are overcome and there is featured the controlling of authority as a function of the rate of control surface movement. These and other features, objects, and advantages of the invention will become more apparent upon reference to the following specification, claims, and appended drawings in which:

Figure 2:
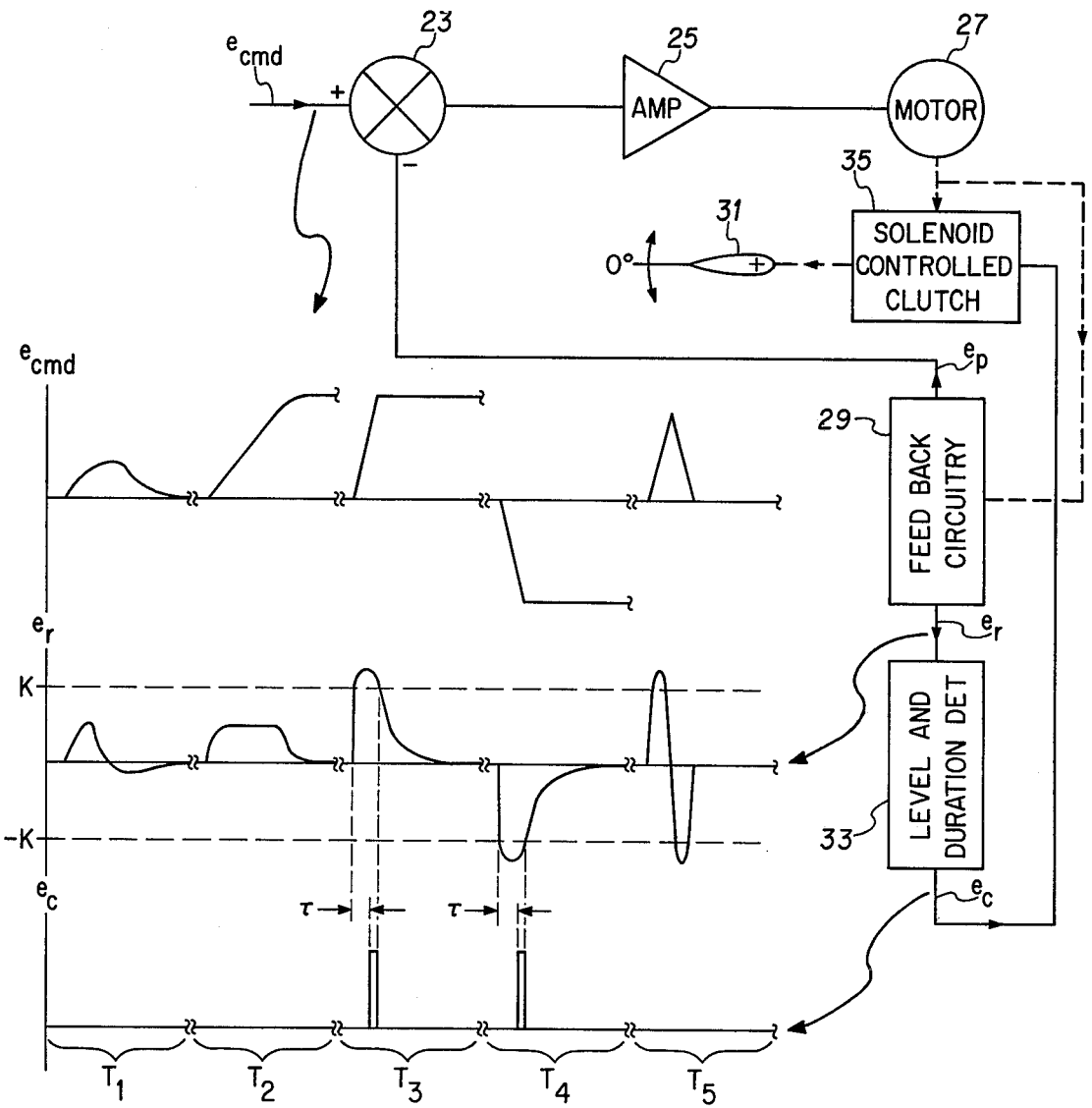
FIG. 2 is a functional circuit diagram representing a preferred embodiment of the present invention and also includes waveforms useful in explaining the operation thereof.
Figure 5:
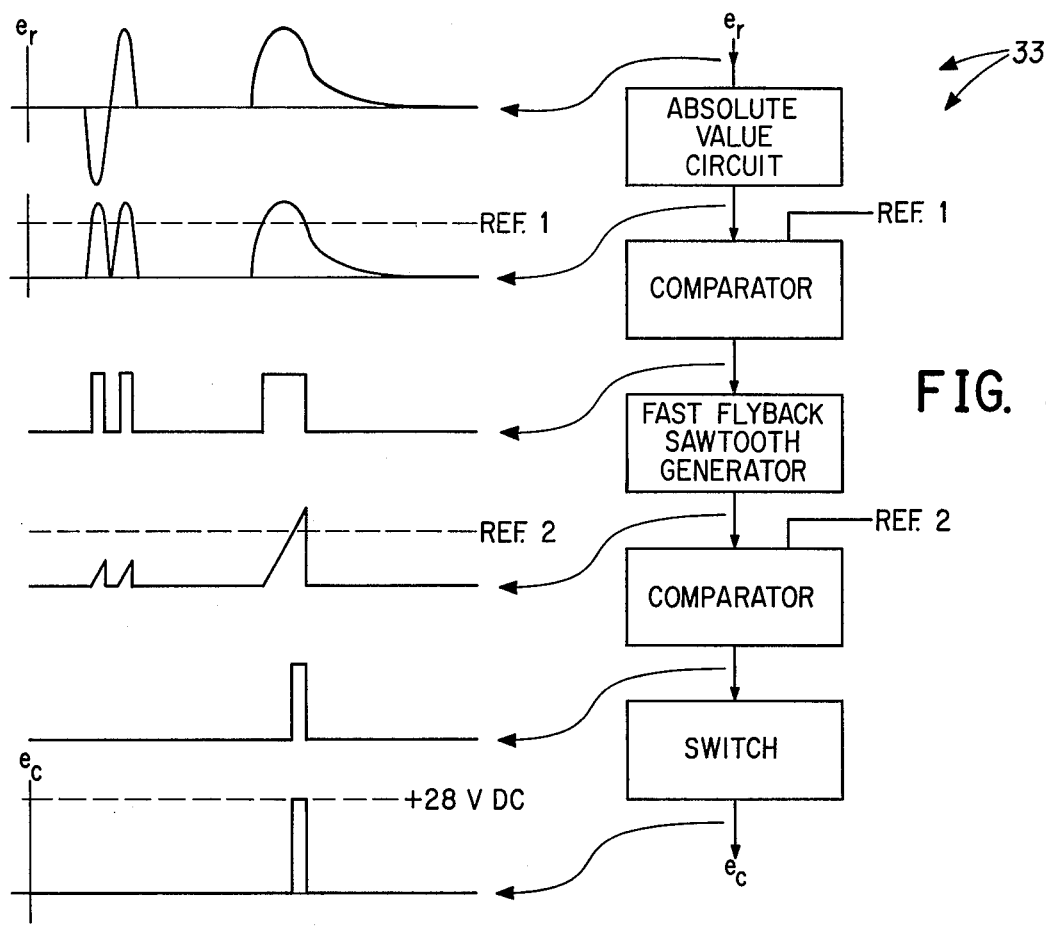
Figure 6:
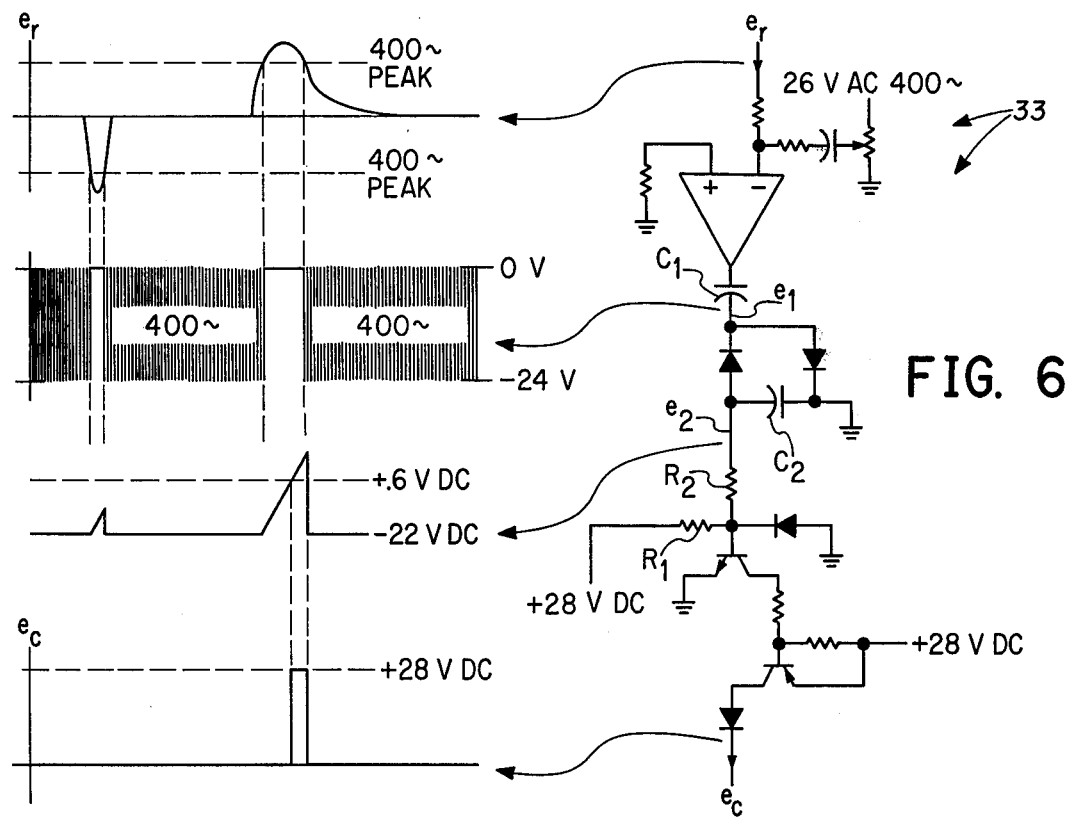
Figure 7:
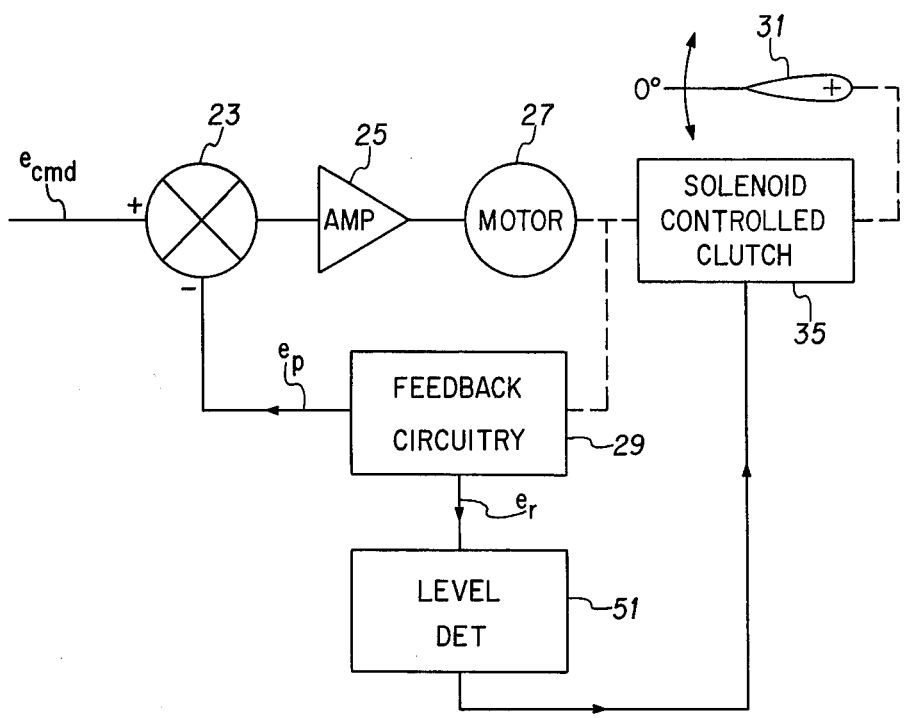
Figure 8:
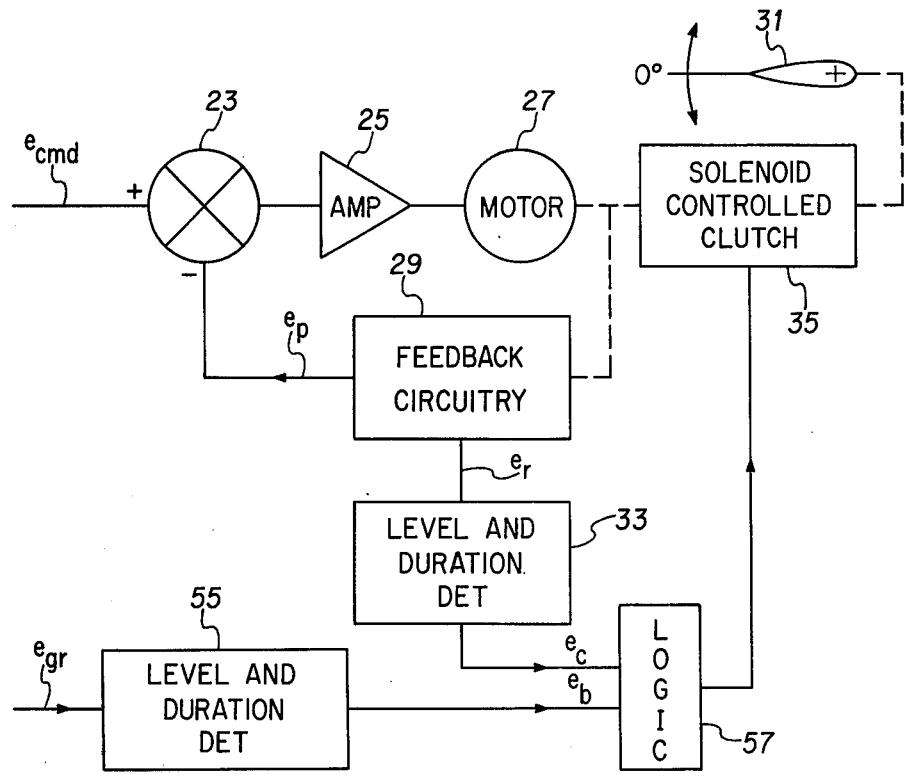

FIGS. 5 and 6 include more detailed diagrams of Item 33 of the FIG. 2 apparatus and also include waveforms useful in explaining the operation thereof; and FIGS. 7 and 8 are functional circuit diagrams representing other preferred embodiments of the present invention.

DETAILED DESCRIPTION OF PREFERRED EMBODIMENT

Figure 1:
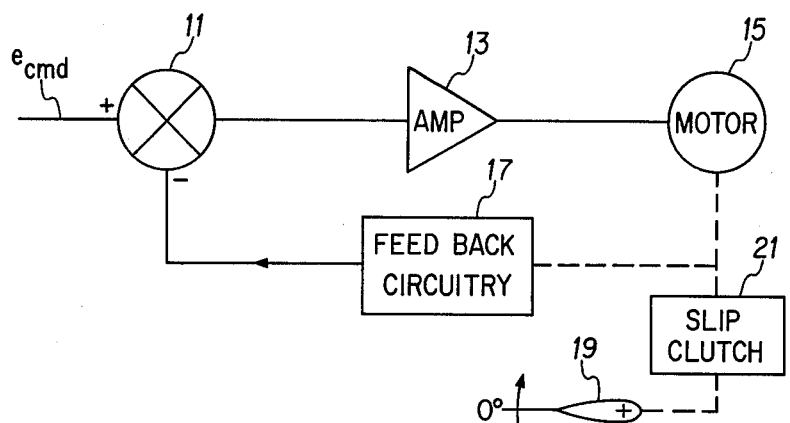
FIG. 1 is a functional circuit diagram representing a typical prior art apparatus for limiting authority.

FIG. 1 illustrates the above-mentioned slip-clutch approach to authority limiting. Briefly, and within the authority limits, the position servo system comprising summing means 11, power amplifier 13, servo motor 15, and feedback circuitry 17, angularly positions aircraft control surface 19 about the 0° (i.e. trim) position in accordance with the autopilot generated command signal $e_{cmd}$. The feedback circuitry 17 usually comprises a position pickoff, a position pickoff and tachometer generator, or a tachometer generator followed by an integrator or other lowpass filter for deriving a position feedback signal from the tach generator rate signal. (The dashed lines in the drawings represent mechanical connections, gearing, etc.) Clutch 21, which slips at a predetermined torque, limits the position servo system authority over surface 19 by preventing, regardless how large $e_{cmd}$ or the motor input drive signal should become, motor 15 from transmitting more than said predetermined torque to surface 19. However, this torque limit must be set low enough to satisfy worst case conditions, and in the worst case substantially less torque is required to exceed the FAA response limits than in about 80% of the usual operating range of the aircraft. Thus, the FIG. 1 approach is effective for assuring limited aircraft transient response in the event of certain autopilot malfunctions, but is objectionable since it also reduces authority during more normal flight conditions.

Turning now to FIG. 2, the inventive embodiment there shown is seen to include, like FIG. 1, a position servo system, but is seen to differ from the FIG. 1 apparatus by the manner and means for controlling the authority had by the position servo system over the aircraft flight control surface 31. Briefly, it has been recognized that the rate of control surface movement is indicative of rate of aircraft response and moreover, leads or anticiates the aircraft rate response. Thus, by controlling the positioning system authority as a function of the rate of control surface movement, instead of limiting maximum torque available, greater absolute torque is available when desired and yet malfunctions can be sensed and corrections made before FAA limits are exceeded. This control of authority as a function of surface movement rate is accomplished in the FIG. 2 apparatus by disengaging 31 from 27 (via clutch 35) whenever the signal $e_r$, which is indicative of surface movement rate, exceeds a predetermined level for a predetermined time duration.

The associated FIG. 2 waveforms, which represent the FIG. 2 apparatus operation in five different situations, illustrate this point more clearly. The $e_{cmd}$ signal for the time period $T_1$ is representative of a typical $e_{cmd}$ signal generated within the linear operating range of a properly functioning autopilot, and the $e_{cmd}$ signal for the time period $T_2$ is representative of a typical $e_{cmd}$ signal generated to a limit by a properly functioning autopilot. In response to and in accordance with the $e_{cmd}$ for period $T_1$, the position servo system effects movement of surface 31 to a new position and then back to a trim position. In response to and in accordance with the $e_{cmd}$ for period $T_2$, the position servo system effects movement of surface 31 to a new position and maintains the new surface position. In both instances, the rate of surface movement is reasonable but not excessive. Thus in both instances, $e_r$, whose instantaneous amplitude is indicative of the instantaneous rate of control surface movement, does not exceed the preset level K, no control trigger pulse is output by 33, and clutch 35 maintains coupling between 27 and 31.

The $e_{cmd}$ signals illustrated for time periods $T_3$ and $T_4$ are representative of the type of $e_{cmd}$ signals generated by the autopilot upon malfunction. For each of these time periods, surfce movement rate is excessive, $e_r$ exceeds the preset level (plus or minus) for at least the time $\tau$, a trigger pulse is generated by 33, and clutch 35 is caused to disengage 31 from 27. Also malfunctions downstream from item 23 would cause outputs equivlant to $T_3$ and $T_4$ periods. The reason it is considered preferable to disengage only after $|e_r|$ has exceeded K for at least time $\tau$ is to practically eliminate, or at least reduce the likelihood of, nuisance disconnects during turbulence. The time period $T_5$ is representative of a turbulence encounter. During such encounters $e_r$ is usually a relatively high frequency signal and although $|e_r|$ can exceed the preset level K, it infrequently exceeds K more than briefly. By requiring $|e_r|$ to exceed K for at least $\tau$, such turbulence produces no control trigger pulse and nuisance disconnects are prevented.

It should be pointed out that clutch 35 is preferably operated by a latching-tupe solenoid which, once triggered by $e_c$ maintains the disconnect until reset. Moreover, in accordance with established safety principles, clutch 35 is set to slip at a predetermined absolute torque limit which permits the pilot to overpower the servo. This latter torque limit is substantially greater however than the above discussed torque limit for the FIG. 1 apparatus.

It should be noted that were a FIG. 1 type of apparatus to satisfy FAA requirements while receiving as input the $e_{cmd}$ of the third and fourth examples in FIG. 2, the same FIG. 1 apparatus would "over-limit" the authority at least in situations such as the second FIG. 2 example. More generally, the FIG. 1 apparatus simply does not permit 19 to respond to increases in $|e_{cmd}|$ beyond a predetermined maximum, thus and depending on the value of said maximum, authority over-limiting will occur in various other situations.

To best utilize the features of the FIG. 2 apparatus the values for K and $\tau$ should be determined experimentally in the particular aircraft in which the apparatus is to be employed. This is because various aircraft will exhibit various response characteristics and/or varying susceptibility to turbulence. It presently appears desirable however to set K at about 90% of the $e_r$ peak expected during a malfunction. This allows relatively rapid intentional changes in the command signal without triggering a disconnect. $\tau$ is then set close to but less than the time a malfunction-caused $e_r$ pulse is expected to remain above this value of K. In the present embodiment $\tau$ is about 50 to 150 milliseconds. In any event, to meet the FAA requirements, $\tau$ should be less than three seconds. If $\tau$ is greater than three seconds no corrective action is provided until after the FAA three second limits have already been exceeded.

Figure 3:
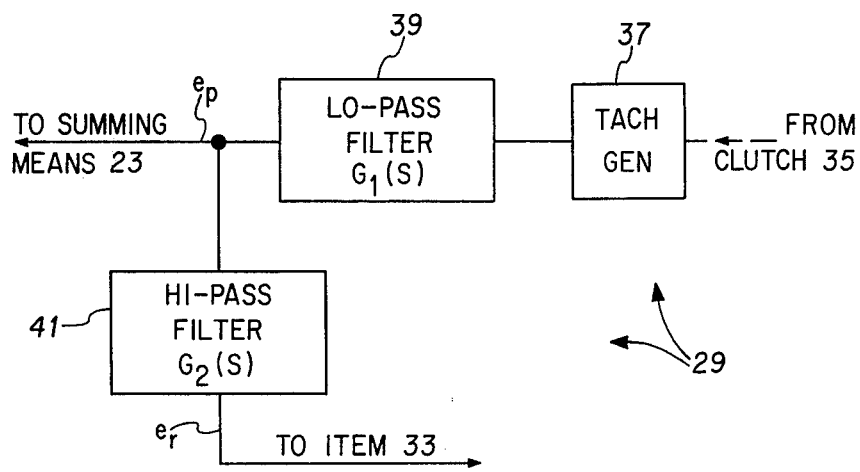
FIGS. 3 and 4 are more detailed diagrams of Item 29 of the FIG. 2 apparatus.
Figure 4:
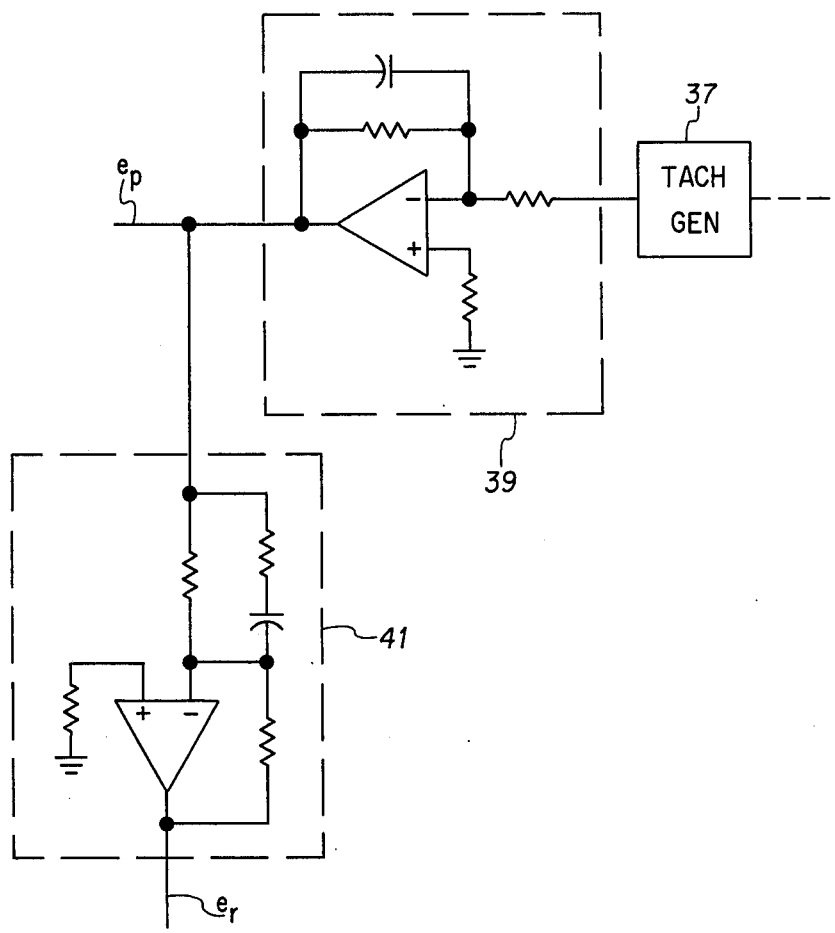

As presently embodied, feedback circuitry 29 includes a tachometer generator, and a low-pass filter receiving the tachometer generator output and producing $e_p$ therefrom. The tach generator output signal can be used without modification as signal $e_r$, but in the present embodiment, since the tach generator output is less accessible than $e_p e_r$ is obtained as shown in FIG. 3 and 4. As shown therein, movement rate indicative signal $e_r$ is derived from the output $e_p$ of low-pass filter 39 by means of high-pass filter 41. The transfer functions of the low-pass and high-pass filters, $G_1(s)$ and $G_2(s)$ respectively, could ech be approximately the inverse of the other so that $e_r$ is approximately a reproduction of the tach generator output. In the presently preferred embodiment filter 41 is also used however to improve the signal to turbulence-produced noise ratio and thus posseses in addition to a high-pass characteristic an even higher frequency rejection characteristic. Thus $G_1(s) \times_2(s)$ is relatively flat out to a relatively high frequency but then rolls off to attenuate the higher frequencies. More particularly $$G_1(s) = \frac{6.78}{(1+3s)} \text{ and } G_2(s) = \frac{3.47(1+3s)}{(1+0.09s)}.$$

The FIG. 4 schematic shows filters 39 and 41 in more detail. The amplifiers are operational differential input amplifiers.

Level and duration detector 33 may be embodied as illustrated in FIG. 5. In view of the associated waveforms provided therein, little additional explanation is required. The absolute value circuit may comprise a full-wave rectifier. Each of the comparators may comprise an op-amp type comparator and the switch may be a transistor type switch. The fast flyback saw-tooth generator can be a simple RC network where R is shunted by a diode so that C discharges rapidly when the input pulse subsides. Whatever saw-tooth generator circuit is employed the fall time should be quite fast so that turbulence produced $e_r$ signals, which are typically relatively high in frequency, will not create a dc buildup at the generator output and cause a nuisance type of disconnect. Fall times on the order of 0.1 to 5.0 milliseconds are presently preferred.

The presently preferred embodiment of level and duration detector 33 is shown in FIG. 6. Therein $e_r$ is compared against the peak of a 400Hz AC reference. During the periods that $e_r$ is less than the AC peak, the op-amp output swings between positive saturation (approx. +12 volts dc) and negative saturation (approx. −12 volts dc) at 400Hz, $e_1$ is clamped at 0 volts and swings at 400Hz between 0 and −24 volts dc, and $e_2$ becomes and stays −22 volts dc. For periods when $e_r$ becomes more positive than the positive AC peak, the op-amp output remains at its negative saturated output (~−12 volts dc), and when $e_r$ becomes more negative than the negative AC peak, the op-amp output remains saturated at its positive saturated output (~12 volts dc). For either occurrence, since there is no AC to couple through $C_1$, $e_1$ remains at 0 volts dc, and $C_2$ begins to discharge through $R_1$ and $R_2$. If $e_r$ is appropriate to hold he op-amp in continued saturation (i.e., no AC output) for a sufficient time, $e_2$ will increase to a level sufficient to turn on the NPN transistor which consequently turns on the PNP transistor to produce the $e_c$ pulse. The reference level against which $e_2$ is compared is of course dependent upon the ratio between $R_1$ and $R_2$.

The embodiment illustrated in FIG. 7 is an alternative to the FIG. 2 apparatus and may be employed if turbulence is either minimal, nonexistent or is for some reason to be ignored. The FIG. 7 apparatus and operation is, with one exception, like that of FIG. 2. The exception is that whenever a preset level such as K is exceeded a trigger pulse is immediately generated to cause the clutch to uncouple 31 from 27. No time delay or duration $\tau$ is required before an $e_c$ trigger pulse is generated. The FIG. 7 feedback circuitry 29 may be identical to that of FIG. 2. The level detector 51 may be implemented by using only the first, second and fifth FIG. 5 components; i.e., the absolute value circuit, the first comparator, and the switch.

The embodiment illustrated in FIG. 8 includes a secondary or backup system to prevent excessive transient aircraft response in the event the primary system fails to function as desired. More particularly, the FIG. 8 apparatus comprises the FIG. 2 apparatus plus a second level and duration detector 55 and logic circuitry 57. Logic circuitry 57 is preferably an OR gate and thus in the usual case when $e_c$ is properly generated, the FIG. 8 apparatus functions like the FIG. 2 apparatus. However, should an $e_c$ trigger pulse fail to appear when needed, clutch 35 will disengage milliseconds later in response to an $e_b$ trigger pulse. The level and duration detector 55 is preferably identical to 33 except that the particular values of level and duration are tailored to accommodate the input signal $e_{gr}$. The principle of operation of 55 is identical to that of 33. The input signal $e_{gr}$ is a signal indicative of the rate, or magnitude, or combination thereof, of aircraft roll or aircraft pitch, and is obtained from the apropriate gyro output. In the present embodiment where $e_{gr}$ is only rate, $e_{gr}$ to a first approximation is quite similar to $e_r$ as illustrated in FIG. 2 except that $e_{gr}$ is delayed from $e_r$ dependent on aircraft characteristics and flight conditions. Also, due to the inertial effects or mechanical integration effects of the aircraft, $e_{gr}$ appears as a slightly integrated or low-pass filtered version of $e_r$. Therefore $e_c$ leads $e_b$. Since $e_b$ in this instance is a backup for a failure in the $e_c$ signal, generation logic 57 is an OR function. However, depending on the desired control characteristics both AND and OR along with timing functions may be used. For instance, logic 57 might be configured to produce a trigger pulse only upon the time coincidence of an $e_b$ pulse and a time window of predetermined length, the time window being a pulse initiated by an $e_c$ pulse.

It should be pointed out that for some applications it may be advantageous to use means other than, and/or in addition to, clutch 35 to reduce the authority of the position servo system over 31. For instance, electrically activable energy absorbing devices such as brakes or dashpots may be employed. Also, an effect identical to that of clutch 35 may be produced by grounding the input to motor 27 when an $e_c$ pulse is produced. Also an $e_c$ pulse could be used to switch in a prior art type current limiter between 23 and 27.

Thus while particular embodiments of the present invention have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:

1. A system for controlling the movement of an aircraft flight control surface comprising:

first means for positioning said control surface in accordance with an input command signal, and providing a signal $S_a$ whose amplitude is indicative of the instantaneous rate of control surface movement, second means comprising level and duration detecting means for providing a signal $S_b$ which indicates when $S_a$ has continuously exceeded a predetermined amplitude $A_1$ for at least a predetermined time $\Delta_1$, and third means responsive to $S_b$ for reducing the authority of said first means over said aircraft control surface when $S_a$ has continuously exceeded said predetermined amplitude $A_1$ for at least said predetermined time $\Delta_1$.

2. The system as defined in claim 1 wherein $\Delta_1$ is less than three seconds.

3. The system as defined in claim 1 wherein said first means comprises a position servo system including an electromechanical actuator and a feedback path from which $S_a$ may be obtained.

4. The system as defined in claim 3 wherein said third means comprises means for eliminating at least temporarily the authority of said first means over said aircraft control surface.

5. A system as defined in claim 1 and further including:

fourth means connected for receiving a signal $S_c$ whose amplitude is indicative of one of the instantaneous aircraft roll rate or the instantaneous aircraft pitch rate, said fourth means comprising level and duration detecting means for providing a signal $S_d$ which indicates when $S_c$ has continuously exceeded a predetermined amplitude $A_2$ for at least a predetermined time $\Delta_2$, said third means also being responsive to $S_d$ and reducing the authority of said first means over said aircraft control surface when $S_c$ has continuously exceeded said predetermined amplitude $A_2$ for at least said predetermined time $\Delta_2$.

6. A method for controlling the movement of an aircraft flight control surface comprising:

providing means for positioning said control surface in accordance with an input command signal, providing a signal $S_a$ whose amplitude is indicative of the instantaneous rate of control surface movement, providing a signal $S_b$ which indicates when $S_a$ has continuously exceeded a predetermined amplitude $A_1$ for at least a predetermined time $\Delta_1$, and reducing the authority of said positioning means over said aircraft control surface when $S_a$ has continuously exceeded said predetermined amplitude $A_1$ for at least said predetermined time $\Delta_1$.

7. The method as defined in claim 6 wherein said reduction of authority comprises eliminating at least temporarily the authority of said positioning means over said aircraft control surface.

8. The method as defined in claim 6 and further comprising:

receiving a signal $S_c$ whose amplitude is indicative of one of the instantaneous aircraft roll rate or the instantaneous aircraft pitch rate, providing a signal $S_d$ which indicates when $S_c$ has continuously exceeded a predetermined amplitude $A_2$ for at least a predetermined time $\Delta_2$, and reducing the authority of said positioning means over said aircraft control surface when $S_c$ has continuously exceeded said predetermined amplitude $A_2$ for at least said predetermined time $\Delta_2$.

* * * * *

UNITED STATES PATENT AND TRADEMARK OFFICE
CERTIFICATE OF CORRECTION

PATENT NO. : 4,032,094

DATED : 6/28/77

INVENTOR(S) : Charles P. Morgan & Jean L. Lamy

It is certified that error appears in the above-identified patent and that said Letters Patent are hereby corrected as shown below:

IN THE SPECIFICATION

Column 1, line 24, after "within" delete --the--.
Column 3, line 17, delete "surfce" and substitute therefor --surface--.
Column 3, line 34, delete "latching-tupe" and substitute therefor --latching-type--.
Column 4, line 7, delete "$e_p e_r$, and substitute therefor --$e_p$, $e_r$--.

Column 4, line 12, delete "ech" and substitute therefor --each--.
Column 4, line 19, delete "$G_1(s)x_2(s)$" and substitute therefor --$G_1(s)xG_2(s)$--.

Column 4, line 48, delete "$e_r$" and substitute therefor --$|e_r|$--.

Column 4, line 62, delete "he" and substitute therefor --the--.

Signed and Sealed this

Twentieth Day of September 1977

[SEAL]

Attest:

RUTH C. MASON
Attesting Officer

LUTRELLE F. PARKER
Acting Commissioner of Patents and Trademarks